(12) United States Patent
Free et al.

(10) Patent No.: US 11,708,919 B2
(45) Date of Patent: *Jul. 25, 2023

(54) HIGH STRENGTH, STRETCHABLE LINER, FOR PIPE

(71) Applicant: INA ACQUISITION CORP., Wilmington, DE (US)

(72) Inventors: Charles Free, Hernando, MS (US); Yevgeny Zaltsman, St. Louis, MO (US); Abu Abraham, St. Louis, MO (US)

(73) Assignee: INA Acquisition Corp., Wilmington, DE (US)

( * ) Notice: Subject to any disclaimer, the term of this patent is extended or adjusted under 35 U.S.C. 154(b) by 167 days.

This patent is subject to a terminal disclaimer.

(21) Appl. No.: 17/080,504

(22) Filed: Oct. 26, 2020

(65) Prior Publication Data

US 2021/0041043 A1 Feb. 11, 2021

Related U.S. Application Data

(63) Continuation of application No. 16/053,587, filed on Aug. 2, 2018, now Pat. No. 10,816,112, which is a continuation of application No. 14/861,370, filed on Sep. 22, 2015, now Pat. No. 10,077,855.

(51) Int. Cl.
*F16L 55/16* (2006.01)
*F16L 9/14* (2006.01)
*F16L 55/165* (2006.01)

(52) U.S. Cl.
CPC ............... *F16L 9/14* (2013.01); *F16L 55/165* (2013.01); *F16L 55/1651* (2013.01); *F16L 55/1656* (2013.01)

(58) Field of Classification Search
CPC ....... F16L 9/14; F16L 55/165; F16L 55/1651; F16L 55/1656

(Continued)

(56) References Cited

U.S. PATENT DOCUMENTS 3,459,014 A 8/1969 Berning
3,520,749 A 7/1970 Rubenstein (Continued)

FOREIGN PATENT DOCUMENTS

DE 22753669 A1 10/1978
DE 4403370 A1 8/1995

(Continued)

OTHER PUBLICATIONS

Trenchless Technology, CIPP of Leaking High-Pressure Gas main, Oct. 2011, 4 pages.

(Continued)

*Primary Examiner* — James F Hook
(74) *Attorney, Agent, or Firm* — Stinson LLP

(57) ABSTRACT

A liner tube for lining a pipe and pipe lining method. Liner material that includes a strength layer and felt backing layer forms the liner tube. The strength layer includes chopped strands of fiber oriented generally parallel to one another and distributed along the strength layer. The felt backing layer can be needle punched to the strength layer. Joining structure can connect opposite longitudinal edge margins of the liner material to form a tube shape. The liner tube is impregnated with a curable polymer, positioned in the pipe, and cured to form the liner. The liner stretches radially when it is positioned in the pipe. As the liner stretches, the strength layer remains fixed to the felt backing and the width of the overlapping edge margins does not decrease.

21 Claims, 5 Drawing Sheets

(58) Field of Classification Search
USPC .................. 138/97, 98; 405/150.1, 184.2
See application file for complete search history.

(56) References Cited

U.S. PATENT DOCUMENTS

| | | | |
|---|---|---|---|
| 4,009,063 | A | 2/1977 | Wood |
| 4,671,840 | A | 6/1987 | Renaud |
| 4,836,715 | A | 6/1989 | Wood |
| 4,976,290 | A | 12/1990 | Gelin et al. |
| 5,049,003 | A | 9/1991 | Barton |
| 5,077,107 | A | 12/1991 | Kaneda et al. |
| 5,164,237 | A | 11/1992 | Kaneda et al. |
| 5,168,006 | A | 12/1992 | Inoguchi et al. |
| 5,186,987 | A | 2/1993 | Imoto et al. |
| 5,218,810 | A | 6/1993 | Isley, Jr. |
| 5,271,433 | A | 12/1993 | Schwert et al. |
| D343,628 | S | 1/1994 | Sciholtz |
| 5,322,653 | A | 6/1994 | Muller |
| 5,334,429 | A | 8/1994 | Imoto et al. |
| D358,599 | S | 5/1995 | Dietterich et al. |
| 5,423,630 | A | 6/1995 | Imoto et al. |
| 5,443,880 | A | 8/1995 | Wike |
| 5,501,248 | A | 3/1996 | Kiest, Jr. |
| 5,535,786 | A | 7/1996 | Makela et al. |
| 5,549,856 | A | 8/1996 | Yokoshima |
| 5,593,700 | A | 1/1997 | Stilgenbauer |
| 5,649,398 | A | 7/1997 | Isley, Jr. et al. |
| 5,683,530 | A | 11/1997 | Fawley et al. |
| 5,698,056 | A | 12/1997 | Kamiyama et al. |
| 5,836,357 | A | 11/1998 | Kittson et al. |
| 5,868,169 | A | 2/1999 | Catallo |
| 5,931,198 | A | 8/1999 | Raji et al. |
| 5,971,030 | A | 10/1999 | Maimets |
| 6,019,136 | A | 2/2000 | Walsh et al. |
| 6,027,783 | A | 2/2000 | Wagener |
| 6,042,668 | A | 3/2000 | Kamiyama et al. |
| 6,146,491 | A | 11/2000 | Wood et al. |
| 6,196,271 | B1 | 3/2001 | Braun et al. |
| 6,250,687 | B1* | 6/2001 | Voigt .................. F16L 55/179 |
| | | | 285/21.2 |
| 6,254,709 | B1 | 7/2001 | Kamiyama et al. |
| 6,360,780 | B1 | 3/2002 | Adolphs et al. |
| 6,508,276 | B2 | 1/2003 | Rädlinger et al. |
| 6,612,340 | B1 | 9/2003 | Lause |
| 6,615,875 | B2 | 9/2003 | Adolphs et al. |
| 6,668,596 | B1 | 12/2003 | Wagener |
| 6,708,729 | B1 | 3/2004 | Smith |
| 6,732,763 | B2 | 5/2004 | Williamson et al. |
| 6,679,966 | B1 | 6/2004 | Brandenburger |
| 7,000,645 | B2 | 2/2006 | Glejbøl et al. |
| 7,018,691 | B2 | 3/2006 | McNeil |
| 7,096,890 | B2 | 8/2006 | Woolstencroft et al. |
| 7,261,788 | B1 | 8/2007 | Driver |
| D568,347 | S | 5/2008 | Manera et al. |
| 7,478,650 | B2 | 1/2009 | Pleydon et al. |
| 7,478,659 | B2 | 1/2009 | Pleydon et al. |
| 7,708,033 | B2 | 5/2010 | Tanaka et al. |
| 7,727,447 | B2 | 6/2010 | Song et al. |
| 7,858,189 | B2 | 12/2010 | Wagener et al. |
| 7,891,381 | B2 | 2/2011 | Anders et al. |
| 7,938,146 | B2 | 5/2011 | Brooks et al. |
| D643,445 | S | 8/2011 | Harrison |
| 7,997,115 | B2 | 8/2011 | Tidl et al. |
| D646,700 | S | 10/2011 | Takeuchi |
| 8,047,238 | B2 | 11/2011 | Wiessner et al. |
| D658,689 | S | 5/2012 | Li |
| 8,375,972 | B2 | 2/2013 | Kiest, Jr. |
| 8,590,575 | B2 | 11/2013 | D'Hulster |
| D696,317 | S | 12/2013 | Carper |
| 8,616,243 | B2 | 12/2013 | Kiest, Jr. |
| D700,224 | S | 2/2014 | Kmoch et al. |
| 8,978,708 | B2 | 3/2015 | Brandenburger et al. |
| D733,198 | S | 6/2015 | Chappel |
| 9,052,053 | B2 | 6/2015 | Kiest |
| 9,222,611 | B2 | 12/2015 | Colasanto |
| 9,248,605 | B2 | 2/2016 | Quitter |
| D764,554 | S | 8/2016 | Charles et al. |
| 9,435,468 | B2 | 9/2016 | Graham |
| 9,522,500 | B2 | 12/2016 | Martin |
| 9,816,660 | B2 | 11/2017 | Schwert et al. |
| 10,077,855 | B2 | 9/2018 | Free et al. |
| 2002/0124898 | A1 | 9/2002 | Renaud et al. |
| 2002/0138298 | A1 | 9/2002 | Ichikawa et al. |
| 2003/0066567 | A1 | 4/2003 | Manners |
| 2003/0113489 | A1 | 6/2003 | Smith |
| 2003/0217777 | A1 | 11/2003 | Williamson et al. |
| 2003/0234057 | A1 | 12/2003 | Woolstencraf et al. |
| 2004/0149341 | A1 | 8/2004 | Driver |
| 2004/0258479 | A1 | 12/2004 | Manners |
| 2005/0028880 | A1 | 2/2005 | Smith |
| 2005/0028881 | A1 | 2/2005 | Smith |
| 2005/0161100 | A1 | 7/2005 | Pleydon et al. |
| 2006/0118028 | A1 | 6/2006 | Schroeder |
| 2006/0124188 | A1 | 6/2006 | Catha et al. |
| 2007/0074774 | A1 | 4/2007 | Chandler |
| 2007/0113971 | A1* | 5/2007 | Driver .................. F16L 55/1651 |
| | | | 156/287 |
| 2007/0172616 | A1 | 7/2007 | Ehsani et al. |
| 2007/0267785 | A1 | 11/2007 | Bellamy et al. |
| 2008/0054530 | A1 | 3/2008 | Choudin et al. |
| 2008/0277012 | A1 | 11/2008 | Anders et al. |
| 2008/0277013 | A1 | 11/2008 | Anders et al. |
| 2009/0116927 | A1 | 5/2009 | Keenan et al. |
| 2009/0308475 | A1 | 12/2009 | Stringfellow et al. |
| 2009/0314409 | A1 | 12/2009 | Ehsani |
| 2010/0012214 | A1* | 1/2010 | Kamiyama .......... F16L 55/1656 |
| | | | 405/184.2 |
| 2010/0078118 | A1 | 1/2010 | Ehsani |
| 2010/0212803 | A1 | 8/2010 | Carr et al. |
| 2011/0174410 | A1* | 7/2011 | Li .......................... F16L 11/085 |
| | | | 156/187 |
| 2012/0291903 | A1 | 11/2012 | Ekelund et al. |
| 2013/0019982 | A1 | 1/2013 | Kobayashi |
| 2013/0074972 | A1 | 3/2013 | Fuechtjohann et al. |
| 2013/0280477 | A1 | 10/2013 | Davis et al. |
| 2014/0034175 | A1 | 2/2014 | Fyfe |
| 2014/0116557 | A1 | 5/2014 | Bichler |
| 2014/0116566 | A1 | 5/2014 | Bader et al. |
| 2014/0356074 | A1 | 12/2014 | Bureau et al. |
| 2015/0045527 | A1 | 2/2015 | Schleicher et al. |
| 2015/0246501 | A1 | 9/2015 | Den Besten et al. |
| 2015/0362115 | A1* | 12/2015 | Arnold ................ F16L 55/1645 |
| | | | 138/172 |
| 2015/0377404 | A1* | 12/2015 | Bichler .................... E03F 7/12 |
| | | | 138/98 |
| 2016/0033072 | A1 | 2/2016 | Mersmann et al. |
| 2019/0232532 | A1 | 8/2019 | Free et al. |
| 2019/0293223 | A1 | 9/2019 | Free et al. |

FOREIGN PATENT DOCUMENTS

| | | |
|---|---|---|
| DE | 19941669 A1 | 3/2001 |
| EP | 0510784 A1 | 10/1992 |
| EP | 2273171 A1 | 1/2011 |
| EP | 2390547 A2 | 11/2011 |
| EP | 2660500 A | 11/2013 |
| EP | 2722157 A1 | 4/2014 |
| EP | 2827040 A1 | 1/2015 |
| JP | H02219635 | 9/1990 |
| JP | H0350280 A | 3/1991 |
| JP | H03292127 A | 12/1991 |
| JP | S5262379 | 5/1997 |
| JP | 2007518608 A | 7/2007 |
| KR | 20060012367 A | 2/2006 |
| WO | 2012145422 A1 | 10/2012 |
| WO | 2013163736 A1 | 5/2013 |
| WO | 2014110544 A1 | 7/2014 |

OTHER PUBLICATIONS

Trenchless Technology, Trenchless Lateral Repair Keeps Oregon Landscape Untouched, Apr. 2012, 2 pages.

(56) References Cited

OTHER PUBLICATIONS

VECTORPLY(R) Performance Composite Reinforcements, product sheet E-LTM 3610, VECTORPLY(R) Corporation, Rev. May 3, 2011.
VECTORPLY(R) Performance Composite Reinforcements, product sheet E-BX 1200, VECTORPLY(R) Corporation, Rev. May 3, 2011.
VECTORPLY(R) Performance Composite Reinforcements, product sheet E-TLX 2400, VECTORSPORTS(TM), VECTORPLY(R) Corporation, Rev. May 3, 2011.
VECTORPLY(R) Performance Composite Reinforcements, product sheet E-QX 4800, LABORSAVER(TM), VECTORPLY(R) Corporation, Rev. May 3, 2011.
VECTORPLY(R) Performance Composite Reinforcements, product sheet E-LM 3610, LABORSAVER(TM), VECTORPLY(R) Corporation, Rev. May 3, 2011.
VECTORPLY(R) Performance Composite Reinforcements, product sheet E-TLX 2200, VECTORSPORTS(TM), VECTORPLY(R) Corporation, Rev. May 3, 2011.
VECTORPLY(R) Performance Composite Reinforcements, product sheet E-BXM 1708, VECTORPLY(R) Corporation, Rev. May 3, 2011.
VECTORPLY(R) Performance Composite Reinforcements, product sheet E-BX 1700, VECTORPLY(R) Corporation, Rev. May 3, 2011.
VECTORPLY(R) Performance Composite Reinforcements, product sheet E-QXCFM 3510, VECTORFUSION(TM) Infusion Specific Reinforcements, VECTORPLY(R) Corporation, Rev. May 3, 2011.
VECTORPLY(R) Performance Composite Reinforcements, product sheet E-BXCFM 1710, VECTORFUSION(TM), Infusion-Specific Reinforcements, VECTORPLY(R) Corporation, Rev. May 3, 2011.
Rongxing Zhou, An Improved MWK Structure for Composite Reinforcement, Textile Research Journal, Published by Sage, Apr. 1, 2005.
Fyfe(R) an Aegion Company, Tyfo(R) Fibrwrap(R) Composite Systems, 3 pages, Copyright 2013 Fyfe Co., LLC (admitted prior art).
Pipelines 2014: From Underground to the Forefront of Innovation and Sustainability; Fifteen Years of Lessons Learned . . . ; (C) ASCE 2014, 14 pages.
Fyfe Co. LLC, Tyfo(R) WEB Composite using Tyfo(R) S Epoxy, 2 pages, Copyright 2005-2012 Fyfe Co. LLC 23-1.
European Combined Search and Examination Report under Sections 17 and 18(3) for Application No. GB1815028.4, dated Oct. 18, 2018, 6 pages.
Examination Report for German Application No. 10 2016 117 513.7, dated Apr. 4, 2022 (English translation).
Applied Felts, Applied Felts Introduces Aquacure RP, Sep. 26, 2013, 1 page, Martinsville, VA.
Tube Forming System consisting of description and four photographs, at least as early as Sep. 21, 2014, 5 pages.
Applied Felts, AquaCure RP, Fiberglass Reinforcement for Inside-Out Strength, electronic brochure, at least as early as Sep. 21, 2014, 4 pages, Martinsville, Virginia (US).

* cited by examiner

HIGH STRENGTH, STRETCHABLE LINER, FOR PIPE

CROSS REFERENCE TO RELATED APPLICATIONS

This application in a continuation of U.S. Ser. No. 16/053,587, filed Aug. 2, 2018, now U.S. Pat. No. 10,816,112, issued Oct. 27, 2020, which is a continuation of U.S. Ser. No. 14/861,370, filed Sep. 22, 2015, now U.S. Pat. No. 10,077,855, issued Sep. 18, 2018, the disclosures of which are incorporated herein it their entireties.

FIELD

The present invention generally relates to a cured-in-place pipe liner and, more specifically, to a high strength, cured-in-placed pipe liner that includes a stretchable layer of oriented chopped fibers secured to a backing material.

BACKGROUND

Over time or because of a particular event or condition (e.g., seismic activity, exposure to excessive or uneven loads or moments, poor compaction, crown corrosion, corrosive soil, etc.), the structural integrity or capacity of force mains, other pipes, and like structures may diminish. For example, such items may crack, corrode, deteriorate, and the like. Such damage to a pipe is particularly problematic when the pipe is used to carry a high pressure fluid because the pressurized fluid can impart significant forces, particularly in the hoop direction, on the pipe. Different methods of repairing or otherwise strengthening damaged pipes and other items are known. For example, fabric liners can be attached to one or more portions of a pipe interior. In cured-in-place pipe lining applications, such liners are impregnated in a curable resin or epoxy, attached to the interior surface of a host pipe, and allowed to cure, thereby forming a watertight barrier between the host pipe and the pipe interior.

Certain conventional cured-in-place pipe liners comprise random-oriented chopped glass fiber fabric. Those having ordinary skill in the art will appreciate that random oriented chopped fiber fabric has certain advantageous properties for cured-in-place pipe lining applications. The fabric has substantial void space providing for carrying a substantial amount of curable polymer that can be cured to form the finished pipe. Moreover, because the random oriented fibers are loosely secured to one another, the individual chopped fibers can move relative to one another, which allows the fabric to stretch as it is being installed in a host pipe to engage the inner wall of the pipe. This feature is advantageous because stretching a liner in the hoop direction as it is being installed in a host pipe helps prevent wrinkles from forming in the liner. By comparison, fabrics made of continuous fibers of the same material are less stretchable. But because the chopped fibers are arranged in a random orientation, the strength characteristics of the chopped fibers, particularly after being stretched are not maximized for pressure pipe lining applications. Examples of pressure pipes include sewer force mains and water pipes.

SUMMARY

In one aspect of the present invention, a liner tube for lining a pipe generally comprises a sheet of liner material having a length and a width and opposite first and second longitudinal edge margins spaced apart along the width of the sheet of liner material. The sheet of liner material includes a strength layer and a felt backing layer. The strength layer comprises chopped strands of fiber extending generally parallel to one another along the width of the sheet of liner material and is distributed along the strength layer. The strength layer has a weight per unit area of at least about 1,200 g/m$^2$. The sheet of liner material is configured as unit into a tube shape so that the first and second longitudinal edge margins of the sheet of liner material are proximate one another and attached to one another at a seam. The liner tube is configured for being impregnated with a curable polymer and stretched radially from the first external diameter to a second external diameter larger than the first external diameter. The seam is constructed to join the first longitudinal edge margin to the second longitudinal edge margin to hold the first longitudinal edge margin from moving in a circumferential direction relative to the second longitudinal edge margin as the liner tube is stretched radially from the first external diameter to the second external diameter.

In another aspect of the present invention, a liner tube for lining a pipe generally comprises a sheet of liner material having a length and a width and opposite first and second longitudinal edge margins spaced apart along the width of the sheet of liner material. The sheet of liner material includes a strength layer and a felt backing layer. The strength layer comprises chopped strands of fiber extending generally parallel to one another along the width of the sheet of liner material and is distributed along the strength layer. The sheet of liner material is configured as unit into a tube shape so that the first and second longitudinal edge margins of the sheet of liner material are proximate one another and attached to one another at a seam. The liner tube is configured for being impregnated with a curable polymer and stretched radially from the first external diameter to a second external diameter larger than the first external diameter. The seam is constructed to join the first longitudinal edge margin to the second longitudinal edge margin to hold the first longitudinal edge margin from moving in a circumferential direction relative to the second longitudinal edge margin as the liner tube is stretched radially from the first external diameter to the second external diameter. The liner tube, when having a diameter of 8 inches including only one layer of strength material, and cured with the curable polymer, when burst tested separate from any host pipe according to the ASTM D1599-14e1 standard, has a burst strength of at least about 600 psi (4150 kPa).

In yet another aspect of the present invention, a liner tube for lining a pipe generally comprises a unitary sheet of liner material having a length and a width and opposite first and second longitudinal edge margins spaced apart along the width of the sheet of liner material. The sheet of liner material includes a strength layer and a felt backing layer. The strength layer comprises chopped strands of fiber extending generally parallel to one another along the width of the unitary sheet of liner material and distributed along the strength layer. The strength layer has a weight per unit area of at least about 1,200 g/m$^2$. The sheet of liner material is configured as unit into a tube shape so that the first and second longitudinal edge margins of the sheet of liner material are proximate one another and attached to one another at a seam. The liner tube is configured for being impregnated with a curable polymer and stretched radially from the first external diameter to a second external diameter larger than the first external diameter. The seam is constructed to join the first longitudinal edge margin to the second longitudinal edge margin to hold the first longitudinal edge margin from moving in a circumferential direction relative to the second longitudinal edge margin as the liner tube is stretched radially from the first external diameter to the second external diameter.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
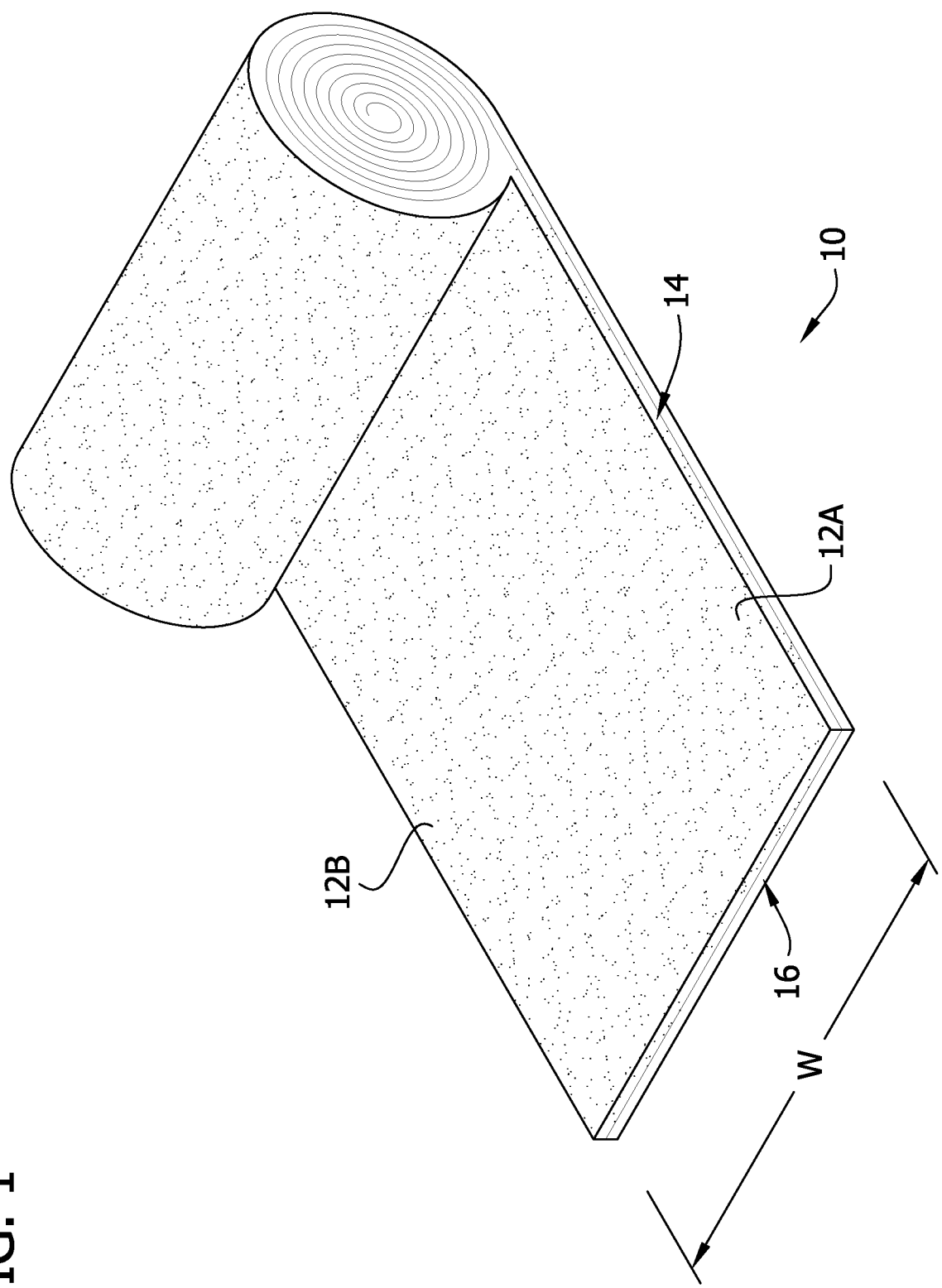
FIG. 1 is a perspective of a roll of liner material.

Referring to FIG. 1, a roll of liner material that is suitable for being used in a cured-in-place pipe lining application is generally indicated at reference numeral 10. The liner material 10 has a width W and first and second longitudinal edge margins 12A, 12B spaced apart along the width W. As will be discussed in further detail below, the liner material 10 incorporates long oriented chop material in such a way that the material can be formed into a liner tube (FIG. 4) in which the longitudinal edge margins 12A, 12B are secured together in overlapping engagement using industrial sewing equipment. The liner material 10 is also configured to be installed in a host pipe P (FIG. 6) by impregnating the liner tube with resin (broadly, a curable polymer), positioning the resin-impregnated liner tube in the host pipe by stretching the liner tube in the hoop direction until it contacts the host pipe, and curing the resin. As will be apparent, the liner tube 10 produces a high strength, watertight liner that is particularly well-suited for carrying pressurized fluids. For example, in one or more embodiments, the liner tube 10 is used to form a cured-in-place pipe liner in a host pipe P used as a force main in a sewer or water pipeline.

Figure 2:
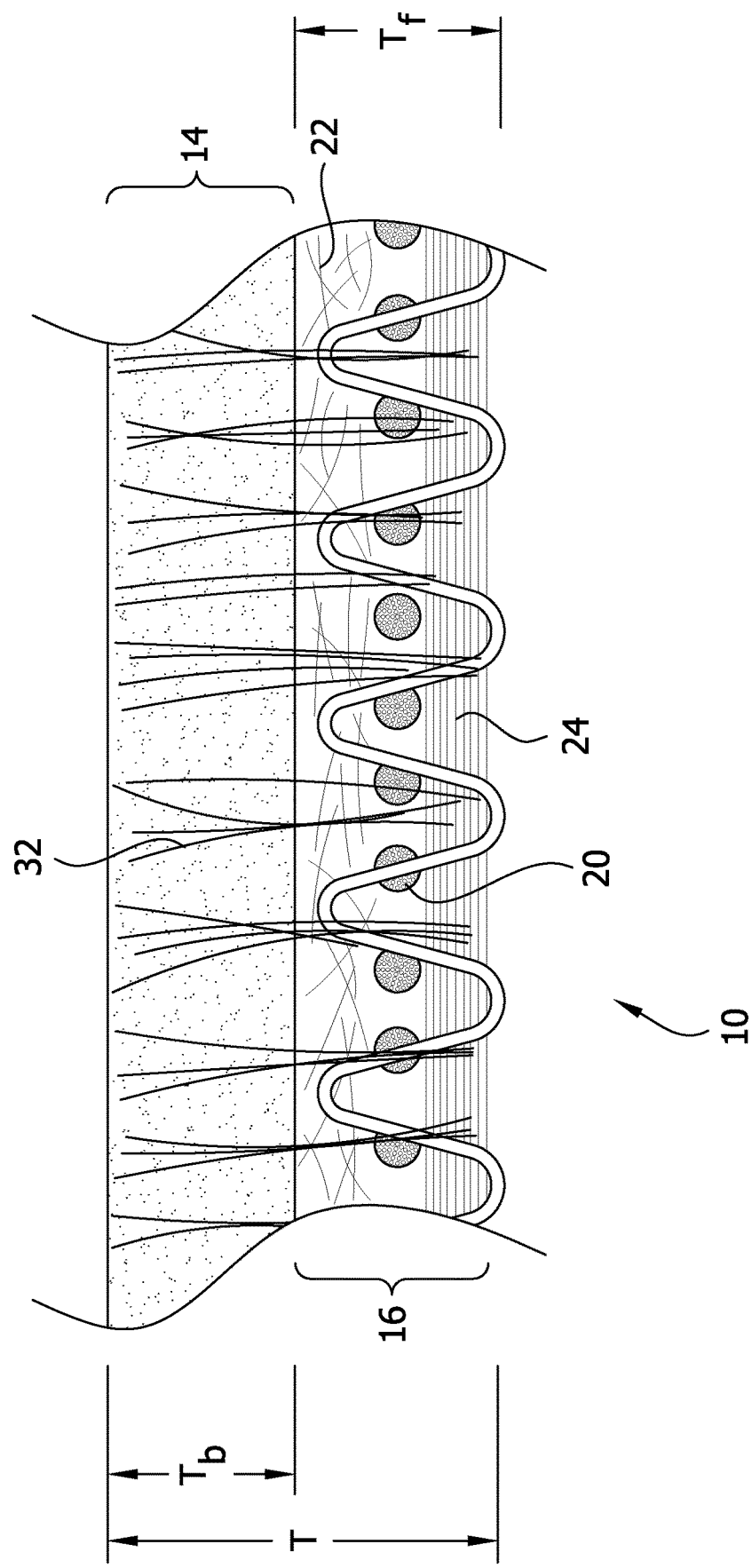
FIG. 2 is a schematic cross-sectional elevation of the liner material.
Figure 3:
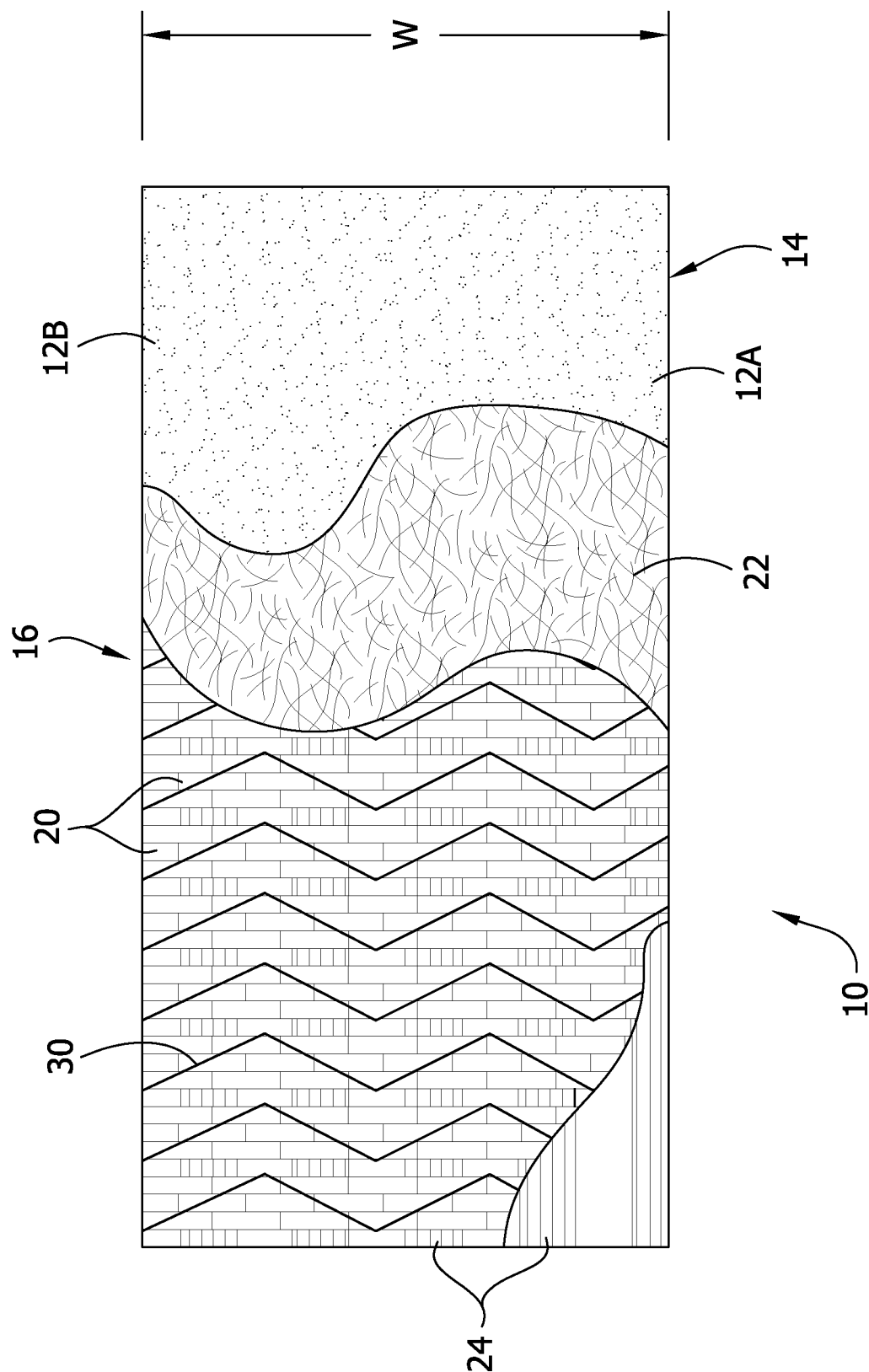
FIG. 3 is a schematic fragmentary top plan view of the liner material unrolled from the roll with parts broken away to show internal construction.

Referring to FIGS. 1-3, the liner material 10 is a multi-layer fabric that includes a felt backing layer 14 and a strength layer 16. As will be discussed in further detail below, the strength layer 16 generally comprises a longitudinally oriented chopped fiber fabric, which is thought to be a desirable material for use in pipe lining applications because it has good strength characteristics and is stretchable. Though conventional longitudinally oriented chopped fiber fabric has certain desirable characteristics in a cured polymer matrix, it is somewhat fragile on its own. The material tends to break apart when handled by automated processing machinery. As will be apparent, unlike conventional longitudinally oriented chopped fiber fabric liners, the strength layer 16 of the liner material 10 is secured to the felt backing layer 14 in such a way as to produce a multilayered liner material that behaves generally like a monolithic piece of fabric. The material 10 can be handled by industrial tube forming machines and industrial sewing machines so that it can be formed into a tube with a fixed overlap seam that can withstand the stretching that occurs during cured-in-place pipe liner installation and achieves surprising strength to resist bursting under internal pressure when cured in place. After separately describing the structure of the felt backing layer 14 and strength layer 16, certain exemplary techniques for securing the layers together and for forming the liner material 10 into a tube will then be described.

The felt backing layer 14 and the strength layer 16 each extend the entire length and width W of the liner material 10. As illustrated in FIG. 2, the felt backing layer 14 has a thickness $T_b$ and the strength layer 16 has a thickness $T_f$. In the illustrated embodiment, the liner material 10 includes no material other than the felt backing layer 14 and strength layer 16. Thus, the thickness $T_b$ of the felt backing layer 14 and the thickness $T_f$ of the strength layer 16 make up the entire thickness T of the liner material 10. In other embodiments, the liner material could include additional layers of material without departing from the scope of the invention. However, it is desirable to have the entire thickness T of the liner material be as small as possible.

The felt backing layer 14 can comprise any suitable felt material. Generally, a "felt" is characterized by being composed of non-woven threads that are matted, condensed, or otherwise pressed together. As will be explained in further detail below, some of the threads in the illustrated felt backing layer 14 are used to secure the felt backing layer to the strength layer 16. The felt backing layer 14 comprises a resin-impregnable material that is stretchable along at least the width W of the liner material 10. Unlike the strength layer 16, the felt backing layer 14 provides structure that is capable of being handled by industrial sewing machines for forming into a tube and stitched. As will be discussed in further detail below, this feature enables the longitudinal edge margins 12A, 12B of the liner material 10 to be stitched together to form the liner tube illustrated in FIG. 4. One suitable material for the felt backing layer 14 is polyester felt. Such felts are used by Insituform® of St. Louis, Mo., in various cured-in-place pipe lining products such as, for example, InsituMain®. Other types of felts may also be used for the felt backing layer without departing from the scope of the invention.

The strength layer 16 generally comprises longitudinally oriented chopped fiber fabric. An exemplary longitudinally oriented chopped fiber fabric is sold by Owings Corning of Toledo, Ohio, under the trade name Ultrapipe™, described in U.S. Pat. No. 6,360,780. In the illustrated embodiment, the strength layer 16 includes a plurality of chopped fibers 20 that are arranged in bundles and oriented generally parallel to the width W of the liner material 10, a plurality of chopped fibers 22 that are oriented randomly, and a plurality of continuous fibers 24 that are arranged in bundles and oriented generally parallel to the length L. The bundles of longitudinally oriented chopped fibers 20 are distributed across the liner material 10 in one sublayer, sandwiched between respective sublayers of random chopped fibers 22 and bundles of continuous fibers 24 that are also distributed across the liner material. The bundles of chopped fibers 20 are loosely secured to the random oriented chopped fibers 22 and bundles of continuous fibers 24 to form the strength layer 16. Although the illustrated strength layer 16 uses longitudinally oriented chopped fibers 20 that are bundled together and loosely secured to sublayers of randomly oriented chopped fibers and bundles of continuous fibers 24, other embodiments can use longitudinally oriented chopped fibers that are held together in other ways without departing from the scope of the invention.

The longitudinally oriented chopped fibers 20 are arranged to provide widthwise reinforcement of the liner material 10 while permitting the liner material to stretch along the width W. In a preferred embodiment, the chopped fibers 20 are glass fibers, but other embodiments can include other types of fibers, such as carbon, aramid, polyethylene, polypropylene, polyester, etc., without departing from the scope of the invention. The chopped fibers 20 are oriented generally parallel to the width W of the liner material 10. Each longitudinally oriented chopped fiber 20 has a length that is shorter than the width W of the liner material 10, but each bundle of chopped fiber extends in continuously across the width W of the material.

As illustrated schematically in FIG. 3, the longitudinally oriented chopped fibers 20 are distributed across the liner material 10. The bundles of chopped fibers 20 are spaced apart from one another along the length of the liner material 10. Within each bundle, the chopped fibers 20 are oriented generally parallel to the width W of the liner material 10. Each bundle includes a large number of chopped fibers 20. The fibers 20 can all have the same length or have different lengths without departing from the scope of the invention. The illustrated chopped fibers 20 form a one-bundle-thick sublayer of oriented chopped fibers, but in other embodiments the chopped fibers can be stacked atop one another to form a sublayer of oriented chopped fibers that is more than one bundle in thickness. In still other embodiments, the longitudinally oriented chopped fibers can be supported in the strength layer without being arranged in bundles.

The longitudinally oriented chopped fibers 20 are loosely bundled together so that they can move relative to one another along their lengths within each bundle. The bundles of chopped fibers 20 are likewise loosely held in place in the strength layer 16 to permit the longitudinally oriented chopped fiber bundles to move relative to one another. Since the chopped fibers 20 can move relative to one another along their lengths, the strength layer 16 can stretch along the width W of the liner material 10. As discussed in further detail below, when the liner material 10 is formed into a tube (FIG. 4), the width W is oriented in the hoop direction of the tube. Since the liner material 10 can stretch along the width W, the liner tube can stretch in the hoop direction as it is installed in the host pipe P. This helps prevent wrinkles from forming in the resulting cured-in-place pipe liner.

Referring to FIG. 3, the bundles of continuous fibers 24 extend along the length of the liner material 10 and are spaced apart from one another along the liner material width W. The continuous fibers 24 provide longitudinal reinforcement of the liner material 10 and also provide a structure for loosely securing the longitudinally oriented chopped fibers 20 in the desired arrangement. The continuous fibers 24 within each bundle are oriented generally perpendicular to the chopped fibers 20 and preferably extend the entire length of the liner material 10. In a preferred embodiment the continuous fibers 24 are glass fibers, but other embodiments can include other types of fibers, such as carbon, aramid, polyethylene, polypropylene, polyester, etc., without departing from the scope of the invention.

In the illustrated embodiment stitching 30 loosely secures the bundles of chopped fibers 20 to the bundles of continuous fibers 24 to form the strength layer 16. But in other embodiments, other ways of loosely securing the chopped fibers to the continuous fibers can be used without departing from the scope of the invention. The stitching 30 is sufficiently loose to permit the chopped fibers 20 within each bundle to move relative to one another along the width W of the liner material 10 while retaining the positioning of the rows of chopped fibers along the length L.

In the illustrated embodiment, the strength layer 16 includes additional, random oriented chopped fibers 22. The random oriented chopped fibers 22 are layered atop the bundled chopped fibers 20 and stitched to the continuous fibers 24 via the stitching 30. The random oriented chopped fibers 22 are loosely held together in the strength layer 16 to shift as the liner material 10 stretches along the width W. In certain embodiments, the random oriented chopped 22 fibers are added to the strength layer 16 to produce a fibrous fabric having a desired weight per unit area. For example, in one or more embodiments, the strength layer 16 has a weight per unit area of from about 950 g/m$^2$ to about 1900 g/m$^2$ (e.g., about 1500 g/m$^2$ or about 1900 g/m$^2$, etc.). The composite liner material 10, including the felt layer 14 and the strength layer 16, can, in suitable embodiments, have a weight per unit area of from about 1200 g/m$^2$ to about 2150 g/m$^2$. Other strength layers can have other weights per unit area without departing from the scope of the invention. Although the illustrated strength layer 16 includes a sublayer of random oriented chopped fibers 22, other embodiments could be constructed without random oriented fibers without departing from the scope of the invention.

As shown in FIG. 2, the felt backing layer 14 is needle punched to the strength layer 16 to secure the strength layer to the felt backing layer and form a substantially unitary sheet of liner material 10. The needle punching pushes a plurality of threads 32 from the felt backing layer 14 through the thickness T of the liner material 10 to secure the strength layer 16 to the felt backing layer 14. The needle punching is preferably configured to push felt backing threads 32 into and/or through the strength layer 16 across the length and width W of the liner material 10. A least some of the needle punched threads 32 extend through the entire thickness $T_f$ of the strength layer 16. The needle punched threads 32 entangle with the random oriented chopped fibers 22, longitudinally oriented chopped fibers 20, continuous fibers 24, and stitching 30 to attach the felt backing layer 14 to the strength layer 16. The result is a liner material 10 that comprises two distinct fabric layers 14, 16 that have been so interconnected the liner material behaves generally like a monolithic sheet of fabric. As will be discussed in further detail below, the liner material 10 is configured to be formed into a tube by attaching the longitudinal edge margins 12A, 12B together. The strong attachment of the strength layer 16 to the felt backing layer 14 through the needle punches 32 enables handling of the material to permit stitching to be used to attach the first longitudinal edge margin 12A to the second longitudinal edge margin 12B without the layers becoming disconnected from one another or shifting out of alignment.

Figure 4:
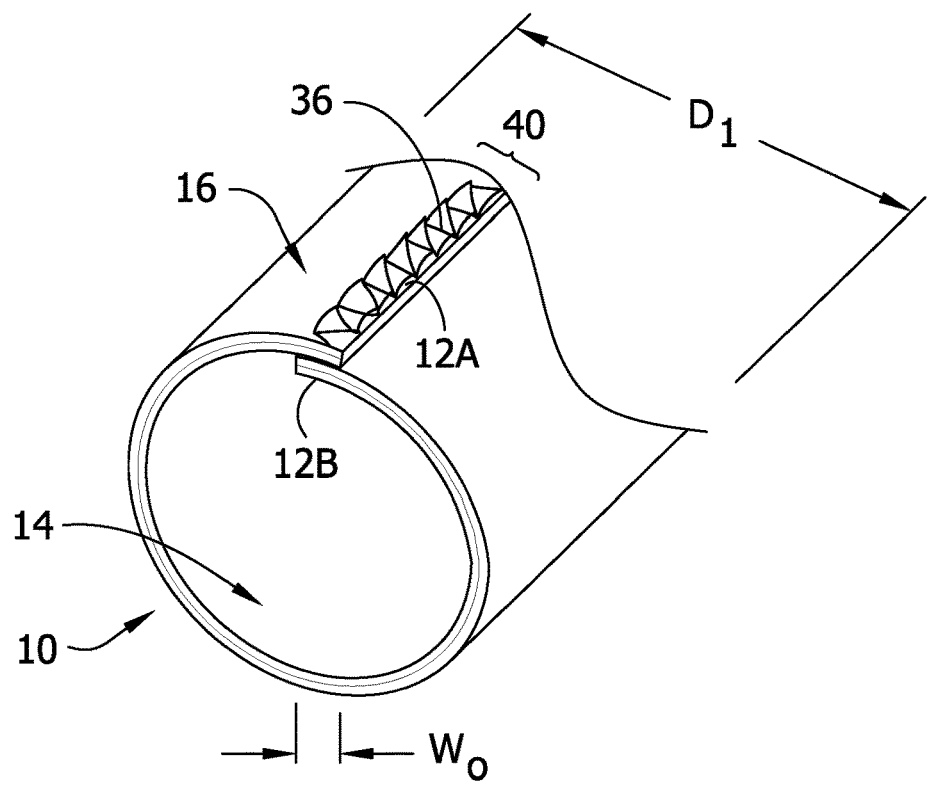
FIG. 4 is a fragmentary perspective of a liner tube formed from the liner material.

Referring to FIG. 4, the liner material 10 is configured to be formed in a tube before being installed in the host pipe P. When formed as a tube, the first and second longitudinal edge margins 12A, 12B of the liner material 10 are positioned in overlapping engagement. Overlap stitching 36 connects the first and second longitudinal edge margins 12A, 12B together in overlapped relation to form a longitudinal overlap portion 40 of the liner tube 10. The thread or threads forming the overlap stitching 36 extend through both the strength layer 16 and felt backing layer 14 of the longitudinal edge margins 12A, 12B to secure them together. In a preferred embodiment, a polyester thread that forms an overlapping double chain stitch 36 connects the first and second longitudinal edge margins 12A, 12B. But in other embodiments, other joining structure can connect the longitudinal edge margins without departing from the scope of the invention.

Figure 6:
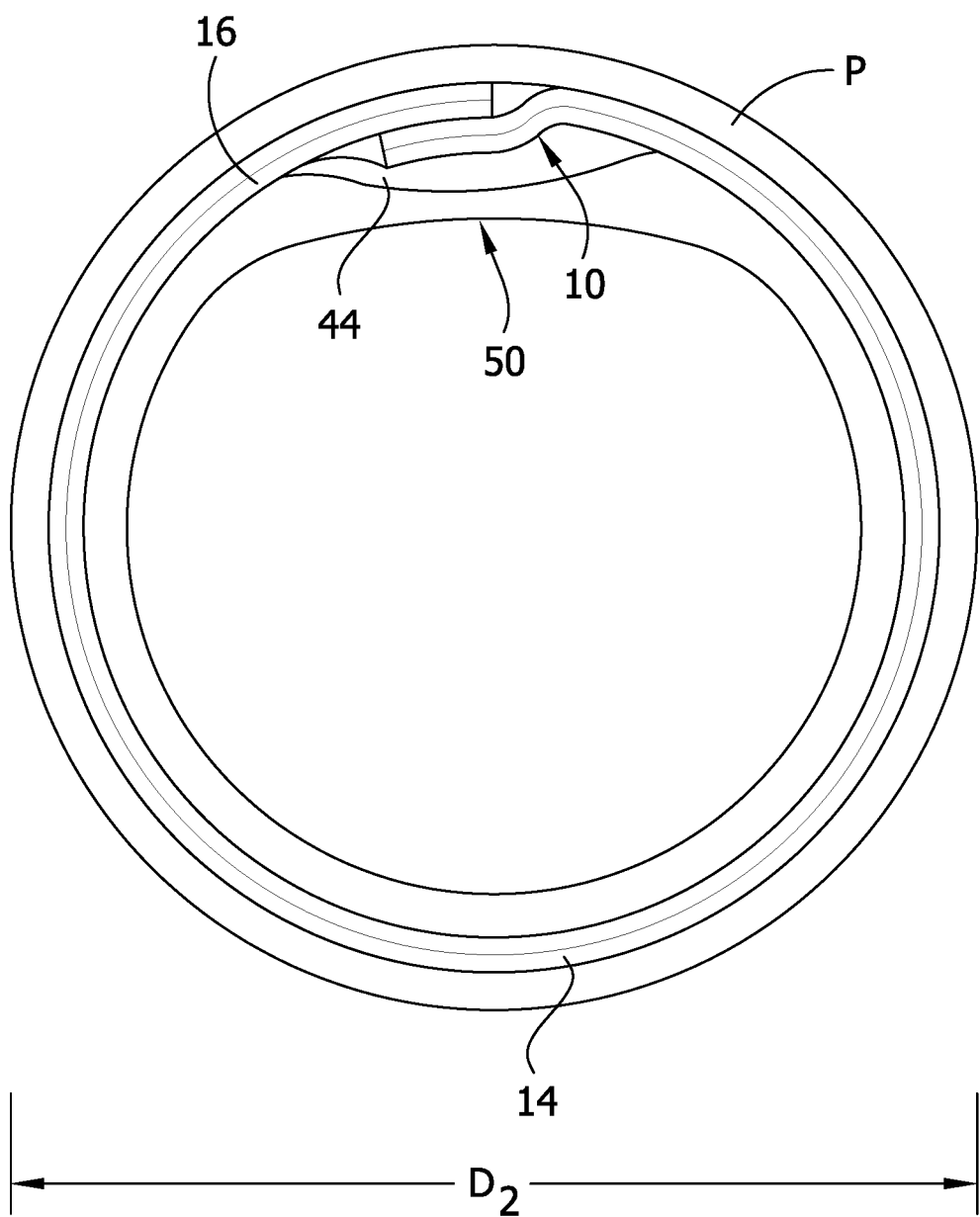
FIG. 6 is an elevation of a pipe lined with the liner tube and flexible covering.

The liner tube 10 is configured to stretch in the radial direction while it is being installed in the host pipe P. As initially assembled, the liner tube 10 has a first external diameter D1. But the liner tube 10 is configured to stretch radially from the first external diameter D1 to a larger second external diameter D2 as it is installed in the host pipe P (FIG. 6). In one or more embodiments, the second external diameter D2 is about 105% to about 107% of the first external diameter D1. As will be appreciated, the second external diameter D2 will usually be equal to the internal diameter of the host pipe P in which the liner tube 10 is installed. In certain embodiments, the internal diameter of the host pipe P is from about 6 inches (15 cm) to about 72 inches (183 cm). It will, however, be understood that liner tubes of various sizes can be used in various fluid handling applications without departing from the scope of the invention.

The overlap portion 40 extends the length of the liner tube 10 and has a width $W_o$. In a preferred embodiment, the Width $W_o$ of the overlap portion is at least about 1.5 inches (3.8 cm). This amount of overlap is particularly suitable for stitching the longitudinal edge margins 12A, 12B of the liner material 10 together in a conventional industrial sewing machine. Depending upon the industrial sewing machine, there may be an upper limit on the overlap of about 2.5 inches (6.35 cm). The overlapping engagement of the longitudinal edge margins 12A, 12B and stitching 36 allows the liner tube 10 to stretch in the hoop direction while retaining sufficient structural integrity at the overlap portion 40. Preferably, when the liner tube 10 stretches from the first external diameter D1 to the second external diameter D2, the width $W_o$ of the longitudinal overlap portion 40 does not decrease. Instead the width $W_o$ of the longitudinal overlap portion 40 either stays the same or increases, stretching proportionally with the circumference of the liner tube 10. The overlapping engagement of the longitudinal edge margins 12A, 12B and the stitching 36 form a strong seam, even after the liner tube 10 is stretched from the first external diameter D1 to the second external diameter D2.

Figure 5:
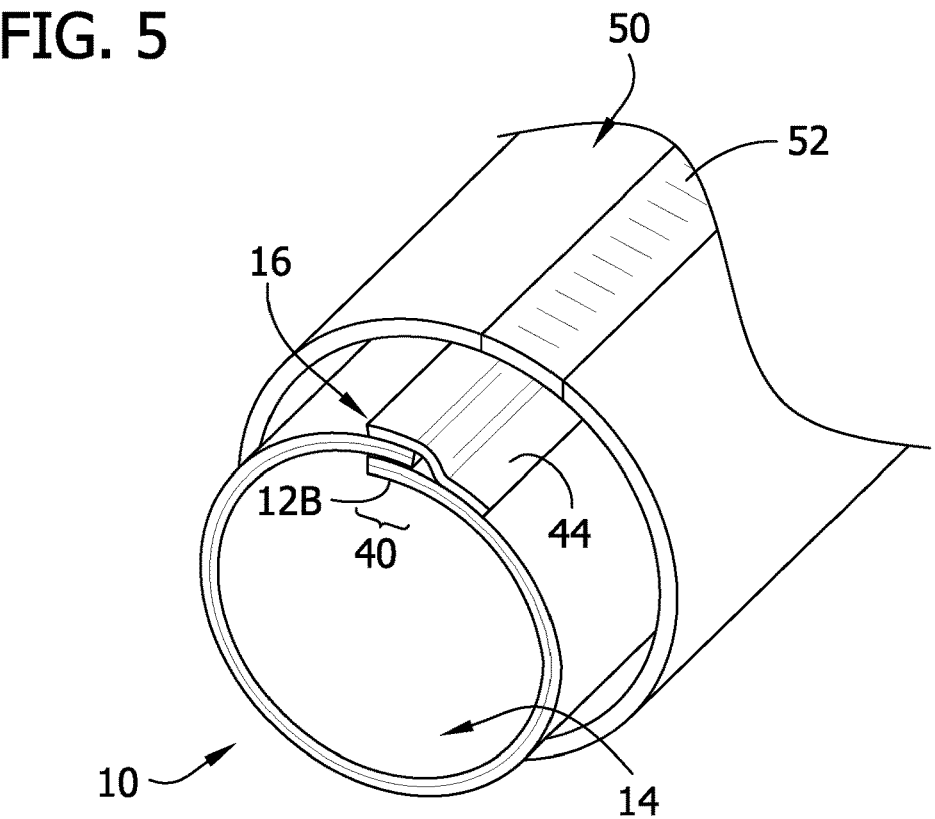
FIG. 5 is a fragmentary perspective of the liner tube received in a flexible covering.

Referring to FIG. 5, in one or more embodiments, the overlapping longitudinal edge margins 12A, 12B of the liner material 10 are reinforced with a reinforcing strip 44. The reinforcing strip 44 is attached to the longitudinal overlap portion 40 of the liner tube 10 to further strengthen the seam between the longitudinal edge margins 12A, 12B. The reinforcing strip 44 can comprise any suitable reinforcing material, but in certain preferred embodiments the reinforcing strip is a two-layer material comprising a woven fiberglass layer and a felt layer. Like liner material 10, the felt layer of the reinforcing strip 44 can be needle punched to the fiberglass layer. In a preferred embodiment, the reinforcing strip is attached to the longitudinal edge margins 12A, 12B of the liner material by heat bonding.

As is also illustrated in FIG. 5, the liner tube 10 is, in certain embodiments, wrapped in a polymeric coated felt covering 50 before being installed in the host pipe P. The liner tube 10 can also be installed in the host pipe P without a polymeric coated felt covering without departing from the scope of the invention. In a preferred embodiment, the covering 50 is a thermoplastic coated felt, for example a polyurethane or polypropylene coated felt. The felt covering 50 is tube shaped and includes an extruded seam 52. The liner tube 10 is nested in the covering 50 before being installed in the host pipe. In one or more embodiments, the liner tube 10 is attached to the covering 50 to prevent movement of the liner tube relative to the covering during installation. For example, in a preferred embodiment, the liner tube 10 is flame bonded to the covering 50 along one or more flame bond lines (not shown) that extend along the length of the liner tube. As will be discussed in further detail below, the polymeric coated felt covering 50 helps maintain a desired concentration of resin in the liner tube 10 after the liner tube is impregnated with resin and positioned in the host pipe P. In the illustrated embodiment, using the polymeric coated felt covering 50 sandwiches the strength layer 16 between two felt layers (i.e., the felt covering 50 and the felt backing layer 14), which helps prevent resin from escaping the strength layer while the liner tube 10 is being installed in the host pipe P.

Referring to FIG. 6, an exemplary method of installing the liner tube 10 in the host pipe P will now be briefly described in reference to a crew of pipe lining technicians who perform the method. It will be understood that the crew members may use suitable tools and machines in carrying out the steps of the method. Moreover, certain steps of the method described as being performed by members of the pipe lining crew may alternatively be performed by automated systems and apparatuses without departing from the scope of the invention.

As an initial step in the method of installing the liner tube 10 in the host pipe P, the liner tube is impregnated with resin. If the reinforcing strip 44 is used, it is impregnated with resin along with the liner tube 10. In a preferred embodiment, this step is performed at a factory remote from the host pipe P and the impregnated liner tube 10 is transported to the site of the host pipe in a suitably climate controlled truck. In other embodiments, the crew could impregnate the liner tube 10 at the site of the host pipe P without departing from the scope of the invention. If the polymeric coated felt covering 50 is used, the liner tube 10 can be impregnated with resin either before or after installing the liner tube in the covering.

After the liner tube 10 is impregnated with resin, the crew positions the liner tube 10 inside the host pipe P. In preferred embodiments, the crew positions the liner tube 10 in the host pipe P using eversion. In the eversion process, the liner tube 10 is turned inside out, advancing down the host pipe as more of the liner tube is everted. In addition, the eversion process stretches the liner tube 10 from the first external diameter D1 to the second external diameter D2 at which the liner material engages an interior surface of the host pipe P in substantially continuous contact around the hoop direction of the pipe. During stretching, both the felt backing layer 14 and the strength layer 16 expand in the hoop direction. The oriented chopped fibers 20 in each bundle move relative one another in the hoop direction to accommodate the stretching. Likewise, the random oriented chopped fibers 22 move relative to one another to accommodate the stretching. The stretching of the liner tube 10 helps prevent wrinkles from forming as the liner tube is positioned in contact with the interior surface of the host pipe 10. As is well understood in the art, the outer layer of the liner before eversion becomes the inner layer of the liner after the liner is installed. Thus, as illustrated in FIG. 6, the crew everts the liner tube 10 and covering 50 so that the covering forms the innermost layer in the host pipe P. In this arrangement, the polymeric coated felt covering 50 provides a resin barrier that prevents the resin in the liner tube 10 from escaping into the interior of the pipe P and forms a smooth surface along which liquid may flow with minimal drag.

In addition to positioning the liner tube 10 in the host pipe P using eversion, the crew can also position the liner tube in the host pipe in other ways without departing from the scope of the invention. For example, in certain embodiments, instead of wrapping the liner tube in the covering 50, the liner tube 10 is wrapped around a carrier tube (not show). The crew then pulls the liner and carrier tube conjointly into the host pipe P. After pulling the liner tube 10 into the host pipe P, the crew radially expands the carrier tube, thereby stretching the liner tube from the first external diameter D1 to the second external diameter D2 at which it contacts the interior surface of the host pipe.

Once the liner tube 10 is positioned in continuous contact with the interior surface of the host pipe P, the resin in the liner tube cures to form a cured-in-place liner along the interior surface of the host pipe P. In certain embodiments, the resin cures in ambient conditions. In other embodiments, the crew cures the resin by directing a suitable form of curing energy, such as heat, ultraviolet radiation, etc., toward the resin impregnated liner tube 10.

The liner tube 10 is believed to form a cured-in-place liner that provides effective structural reinforcement and waterproofing of host pipes P that carry pressurized fluid. A shown in Table 1 below, five samples of the liner tube 10 and felt covering 50 were formed into a cured-in-place liner in an eight-inch (20.3-cm) diameter pipe and six samples of the liner tube 10 and felt covering 50 were formed into a cured-in-place liner in a twelve-inch (30.5-cm) diameter pipe. Two of the eight-inch samples were formed of liner material 10 having a weight per unit area of about 1500 g/m² and three were formed of liner material having a weight per unit area of about 1900 g/m². Two of the twelve-inch samples were formed of liner material 10 having a weight per unit area of about 1500 g/m² and four were formed of liner material having a weight per unit area of about 1900 g/m². The samples were removed from the host pipes in which they were formed and burst tested according to the ASTM D1599-14e1 standard. The testing measured only the burst strength of the cured-in-place liners formed by the liner tubes 10 and coverings 50 and did not account for any additional strength that would be imparted by a preexisting host pipe. The burst strength was the pressure at which the cured-in-place liners failed when tested under the ASTM D1599-14e1 standard. The burst strengths established in testing were surprising. Preferably, the cured-in-place pipe liner samples all had a burst strength of at least about 600 psi (4150 kPa). As illustrated in Table 1, the burst strength of each of the eight-inch liner samples was at least about 900 psi (6200 kPa) and each of the twelve-inch samples was at least about 1000 psi (6900 kPa).

TABLE 1

| Pipe Diameter | Sample | Weight per Unit Area - g/m² | Burst Strength - psi (kPa) |
|---|---|---|---|
| 8 inches | A | 1900 | 950 (6550) |
| (20.3 cm) | B | 1900 | 950 (6550) |
| | C | 1900 | 900 (6200) |
| | D | 1500 | 950 (6550) |
| | E | 1500 | 900 (6200) |
| 12 inches | F | 1500 | 1150 (7950) |
| (30.5 cm) | G | 1500 | 1300 (8900) |
| | H | 1900 | 1150 (7950) |
| | I | 1900 | 1000 (6900) |
| | J | 1900 | 1400 (9650) |
| | K | 1900 | 1300 (8950) |

As can be seen, the liner tube 10 provides a cured-in-place pipe liner with high burst strength, which makes the liner tube particularly well-suited for lining high pressure pipes such as water mains. The liner tube 10 uses a layer of chopped fibers 20 that are oriented generally parallel to the hoop direction to provide structural reinforcement against the forces imparted upon a pipe by pressurized fluid. Because the fibers 20 oriented in the hoop direction are chopped instead of continuous, the liner tube 10 can stretch as it is being installed to limit the chances of forming the liner with wrinkles, and the stretching does not cause the liner material to lose strength. The needle punching securely attaches the strength layer 16 to the felt backing layer 14, which enables the longitudinal edge margins 12A, 12B of the liner material 10 to be stitched together to form the liner tube. The overlap portion 40 and stitching 36 provide good strength at the seam between the longitudinal edge margins 12A, 12B, even after the liner tube has stretched during installation.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A liner tube for lining a pipe, the liner tube comprising a sheet of liner material having a length and a width and opposite first and second longitudinal edge margins spaced apart along the width of the sheet of liner material, the sheet of liner material including a strength layer and a felt backing layer, the strength layer comprising chopped strands of fiber extending generally parallel to one another along the width of the sheet of liner material and being distributed along the strength layer, the strength layer having a weight per unit area of at least about 1,200 g/m², the sheet of liner material being configured as unit into a tube shape so that the first and second longitudinal edge margins of the sheet of liner material are proximate one another and attached to one another at a seam, the liner tube being configured for being impregnated with a curable polymer and stretched radially from the first external diameter to a second external diameter larger than the first external diameter, the seam being constructed to join the first longitudinal edge margin to the second longitudinal edge margin to hold the first longitudinal edge margin from moving in a circumferential direction relative to the second longitudinal edge margin as the liner tube is stretched radially from the first external diameter to the second external diameter.

2. A liner tube as set forth in claim 1, wherein the strength layer has a weight per unit area of at least about 1,500 g/m².

3. A liner tube as set forth in claim 2 wherein the strength layer has a weight per unit area of at least about 1,900 g/m².

4. A liner tube as set forth in claim 1 wherein the sheet of liner material has a weight per unit area of at least about 1,500 g/m².

5. A liner tube as set forth in claim 4 wherein the sheet of liner material has a weight per unit area of at least about 2,150 g/m².

6. A liner tube as set forth in claim 1, wherein the seam is configured such that a circumferential position of the first longitudinal edge margin with respect to the second longitudinal edge margin remains substantially constant as the liner tube stretches from the first external diameter to the second external diameter.

7. A liner tube as set forth in claim 1, further comprising a reinforcing strip extending longitudinally along the seam.

8. A liner tube as set forth in claim 7, wherein the reinforcing strip has a first longitudinal edge margin radially overlapping the first longitudinal edge margin of the of the sheet of liner material and a second longitudinal edge margin radially overlapping the second longitudinal edge margin of the sheet of liner material.

9. A liner tube as set forth in claim 8, wherein the reinforcing strip is attached to each of the first and second longitudinal edge margins of the sheet of liner material, and the reinforcing strip is configured to remain attached to each of the first and second longitudinal edge margins of the sheet of liner material as the liner tube stretches from the first external diameter to the second external diameter.

10. A liner tube as set forth in claim 9, wherein the first longitudinal edge margin of the reinforcing strip is prevented from moving in a circumferential direction away from the second longitudinal edge margin as the liner tube stretches from the first external diameter to the second external diameter.

11. A liner tube as set forth in claim 1, wherein the first longitudinal edge margin contacts the second longitudinal edge margin.

12. A liner tube as set forth in claim 1 wherein the first longitudinal edge margin overlaps the second longitudinal edge margin.

13. A liner tube as set forth in claim 1, wherein the felt backing layer is needle punched to the strength layer.

14. A liner tube for lining a pipe, the liner tube comprising a sheet of liner material having a length and a width and opposite first and second longitudinal edge margins spaced apart along the width of the sheet of liner material, the sheet of liner material including a strength layer and a felt backing layer, the strength layer comprising chopped strands of fiber extending generally parallel to one another along the width of the sheet of liner material and being distributed along the strength layer, the sheet of liner material being configured as unit into a tube shape so that the first and second longitudinal edge margins of the sheet of liner material are proximate one another and attached to one another at a seam, the liner tube being configured for being impregnated with a curable polymer and stretched radially from the first external diameter to a second external diameter larger than the first external diameter, the seam being constructed to join the first longitudinal edge margin to the second longitudinal edge margin to hold the first longitudinal edge margin from moving in a circumferential direction relative to the second longitudinal edge margin as the liner tube is stretched radially from the first external diameter to the second external diameter, wherein the liner tube, when having a diameter of 8 inches including only one layer of strength material, and being cured with the curable polymer, is burst tested separate from any host pipe according to the ASTM D1599-14e1 standard (2014) and has a burst strength of at least about 600 psi (4150 kPa).

15. A liner tube as set forth in claim 14 wherein the liner tube, when having a diameter of 8 inches including only one layer of strength material, and being cured with a curable resin, is burst tested separate from any host pipe according to the ASTM D1599-14e1 standard (2014) and has a burst strength of at least about 900 psi (6200 kPa).

16. A liner tube as set forth in claim 14, wherein the seam is configured such that a circumferential position of the first longitudinal edge margin with respect to the second longitudinal edge margin remains substantially constant as the liner tube stretches from the first external diameter to the second external diameter.

17. A liner tube as set forth in claim 14, wherein the first longitudinal edge margin contacts the second longitudinal edge margin.

18. A liner tube as set forth in claim 14 wherein the first longitudinal edge margin overlaps the second longitudinal edge margin.

19. A liner tube as set forth in claim 14, wherein the felt backing layer is needle punched to the strength layer.

20. A liner tube as set forth in claim 14, wherein the strength layer has a weight per unit area of at least about 1,500 g/m$^2$.

21. A liner tube for lining a pipe, the liner tube comprising a unitary sheet of liner material having a length and a width and opposite first and second longitudinal edge margins spaced apart along the width of the sheet of liner material, the sheet of liner material including a strength layer and a felt backing layer, the strength layer comprising chopped strands of fiber extending generally parallel to one another along the width of the unitary sheet of liner material and being distributed along the strength layer, the strength layer having a weight per unit area of at least about 1,200 g/m$^2$, the sheet of liner material being configured as unit into a tube shape so that the first and second longitudinal edge margins of the sheet of liner material are proximate one another and attached to one another at a seam, the liner tube being configured for being impregnated with a curable polymer and stretched radially from the first external diameter to a second external diameter larger than the first external diameter, the seam being constructed to join the first longitudinal edge margin to the second longitudinal edge margin to hold the first longitudinal edge margin from moving in a circumferential direction relative to the second longitudinal edge margin as the liner tube is stretched radially from the first external diameter to the second external diameter.

* * * * *